United States Patent
Dobrovolsky

(12) 
(10) Patent No.: US 10,449,796 B2
(45) Date of Patent: Oct. 22, 2019

(54) METHOD AND SYSTEM FOR PROCESSING PRINTED PRODUCTS

(75) Inventor: Sasha Dobrovolsky, San Leandro, CA (US)

(73) Assignee: ePAC Technologies, Inc., San Leandro, CA (US)

(*) Notice: Subject to any disclaimer, the term of this patent is extended or adjusted under 35 U.S.C. 154(b) by 432 days.

(21) Appl. No.: 11/175,676

(22) Filed: Jul. 6, 2005

(65) Prior Publication Data

US 2007/0008587 A1    Jan. 11, 2007

(51) Int. Cl.
| | |
|---|---|
| G06K 15/16 | (2006.01) |
| B42C 19/08 | (2006.01) |
| B65H 5/04 | (2006.01) |
| B65H 29/60 | (2006.01) |
| B65H 37/00 | (2006.01) |

(52) U.S. Cl.
CPC ............. *B42C 19/08* (2013.01); *B65H 5/04* (2013.01); *B65H 29/60* (2013.01); *B65H 37/00* (2013.01); *G06K 15/16* (2013.01); *B65H 2301/16* (2013.01); *B65H 2301/314* (2013.01); *B65H 2301/422* (2013.01); *B65H 2405/33* (2013.01); *B65H 2511/415* (2013.01); *B65H 2513/42* (2013.01)

(58) Field of Classification Search
CPC ..................................................... B42C 19/08
USPC ......... 271/3.14; 358/1.12; 399/16, 361, 3.14
See application file for complete search history.

(56) References Cited

U.S. PATENT DOCUMENTS

| | | | |
|---|---|---|---|
| 2,922,171 A | | 1/1960 | Kleineberg et al. |
| 3,804,404 A | * | 4/1974 | Bosshard ............... B42B 2/02 |
| | | | 250/568 |

(Continued)

FOREIGN PATENT DOCUMENTS

| | | |
|---|---|---|
| DE | 198 11 635 | 9/1999 |
| EP | 0 359 727 | 3/1990 |

(Continued)

OTHER PUBLICATIONS

International Search Report, dated Nov. 1, 2007.
Extended European Search Report.

*Primary Examiner* — Peter K Huntsinger
(74) *Attorney, Agent, or Firm* — Patterson Intellectual Property Law, P.C.; Edward D. Lanquist, Jr.; Grant M. Ford

(57) ABSTRACT

A system for processing printed products includes a transfer station which is provided with an infeeding location for infeeding printed products to the transfer station from a delivery station. The transfer station further comprises a number of connecting locations and a removal location. To each of the connecting locations is connected a processing station. An output station is connected to the removal location. The transfer station is further provided with a transporting device for moving the printed products within the transfer device between the infeeding location, the various connecting locations and the removal location. The printed product infed to the transfer station at the infeeding location is transported in any sequence from the transfer station to one of the processing stations. After completion of the processing operation in a particular processing station, the printed product is moved back to the transfer station. The finished printed products are removed from the transfer station at the removal location.

34 Claims, 3 Drawing Sheets

(56) References Cited

U.S. PATENT DOCUMENTS

| | | | |
|---|---|---|---|
| 4,022,455 A | | 5/1977 | Newsome et al. |
| 4,548,024 A | | 10/1985 | Fine |
| 4,591,406 A | | 5/1986 | Garber |
| 4,745,004 A | | 5/1988 | Schwerin |
| 5,024,570 A | | 6/1991 | Kiriseko et al. |
| 5,025,610 A | | 6/1991 | Graushar |
| 5,182,796 A | | 1/1993 | Shibayama et al. |
| 5,222,860 A | * | 6/1993 | Kamath ............... B65H 1/26 271/4.01 |
| 5,414,974 A | | 5/1995 | Van De Ven |
| 5,465,213 A | | 11/1995 | Ross |
| 5,710,635 A | * | 1/1998 | Webster et al. ............. 358/296 |
| 6,003,863 A | * | 12/1999 | Barringer et al. ........... 271/267 |
| 6,304,795 B1 | | 10/2001 | Reist |
| 6,834,169 B2 | | 12/2004 | Hren et al. |
| 6,971,646 B2 | * | 12/2005 | Schmid ...................... 271/192 |
| 7,136,614 B2 | | 11/2006 | Kang et al. |
| 7,396,012 B2 | * | 7/2008 | Bobrow ...................... 271/185 |
| 2001/0055123 A1 | * | 12/2001 | Ryan et al. .................. 358/1.12 |
| 2002/0006238 A1 | | 1/2002 | Kobayashi |
| 2002/0061238 A1 | * | 5/2002 | Marsh .................... B26D 5/02 412/9 |
| 2004/0156064 A1 | * | 8/2004 | Owen et al. ................. 358/1.13 |
| 2004/0160258 A1 | | 8/2004 | Hren et al. |
| 2004/0247365 A1 | * | 12/2004 | Lofthus et al. ............. 400/582 |
| 2005/0019067 A1 | | 1/2005 | Kang et al. |
| 2012/0251270 A1 | | 10/2012 | Speller et al. |

FOREIGN PATENT DOCUMENTS

| | | |
|---|---|---|
| EP | 1 302 423 | 4/2003 |
| JP | 9 142613 | 6/1997 |
| JP | 11 349105 | 12/1999 |

\* cited by examiner

METHOD AND SYSTEM FOR PROCESSING PRINTED PRODUCTS

BACKGROUND OF THE INVENTION

1. Field of the Invention

The present invention relates generally to processing printed products and more particularly to a method and a system for processing printed products, such as books and parts thereof.

2. Description of the Related Art

Known systems for processing printed products comprise a number of processing stations which are arranged one after another along a given processing path. The products to be processed are transported along the processing path, processed at the various processing stations and finally removed from the processing path at a removal location. A typical example of a system of this kind is disclosed in U.S. published patent application US 2002/0061238 A1 which shows an apparatus for producing books.

In systems of this type with the processing stations being fixedly arranged along a predetermined processing path (so-called "in-line systems") the processing steps have to be carried out in a predetermined sequential order defined by the mutual arrangement of the processing stations.

SUMMARY OF THE INVENTION

In a first aspect of the present invention, a printed product is fed to a first infeeding location of a transfer station, then transported in any sequence from the transfer station to one of a number of processing stations connected to the transfer station and processed at the respective processing station. The processed printed product is transported back to the transfer station after completion of the processing step at one of the processing stations.

According to a further embodiment of the present invention, a printed product fed to a first infeeding location of a transfer station is moved within the transfer station to a first outfeeding location of the transfer station. From this first outfeeding location the printed product is transported to a first processing station connected to the transfer station. At this first processing station the printed product is processed. After being processed at this first processing station, the printed product is transported back to a first receiving location of the transfer station. The processed printed product is then moved within the transfer station to a first removal location of the transfer station and finally removed from the transfer station at the first removal location.

Preferably the processed printed product infed to the first receiving location of the transfer station is subsequently transported to further processing stations connected to the transfer station and processed in these further processing stations. After completion of the processing step in one of the processing stations the processed printed product is transported back to the transfer station.

In a still further embodiment the printed product is temporarily stored or buffered in the transfer station between the various processing steps carried out at the further processing stations.

In a further aspect of the present invention a system for processing printed products comprises a transfer station which is provided with at least a first infeeding location for infeeding printed products to the transfer station, at least a first removal location for removing processed printed products from the transfer station and at least a first connecting location. A first processing station is operatively connected to this first connecting location of the transfer device. The transfer station is further provided with a transporting device for moving the printed products within the transfer device between the first infeeding location, the first connecting location and the first removal location.

According to a still further embodiment of the present invention a system for processing printed products comprises a transfer station which is provided with at least a first infeeding location for infeeding printed products to the transfer station, at least a first removal location for removing processed printed products from the transfer station and a number of connecting locations. A processing station is operatively connected to each of the connecting locations.

In a further aspect of the present invention the transfer station comprises buffer means for temporarily storing printed products. Preferably these buffer means comprise shelving means for temporarily shelving printed products.

In general the present invention provides for a central transfer station to which the articles to be processed are fed. A number of processing stations are connected to the transfer station. The articles fed to the transfer station are transported in sequence to the various processing stations. After termination of the processing step in a particular processing station, the articles are always transported back to the transfer station and from there to the next processing station or to a removal location. The transfer station serves as a kind of interchange for the processing stations.

The method and the system for processing printed products according to the present invention provides for many different production paths along which the products to be processed can be moved. This results in a great flexibility in the sequence of the various processing operations. This means that the sequence of the various steps in the processing of a printed product can easily be optimized.

The printed products can anytime be buffered or temporarily stored in the transfer station until the products are needed for the next processing step or the removal.

The system can still operate even if a processing station is temporarily out of service.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
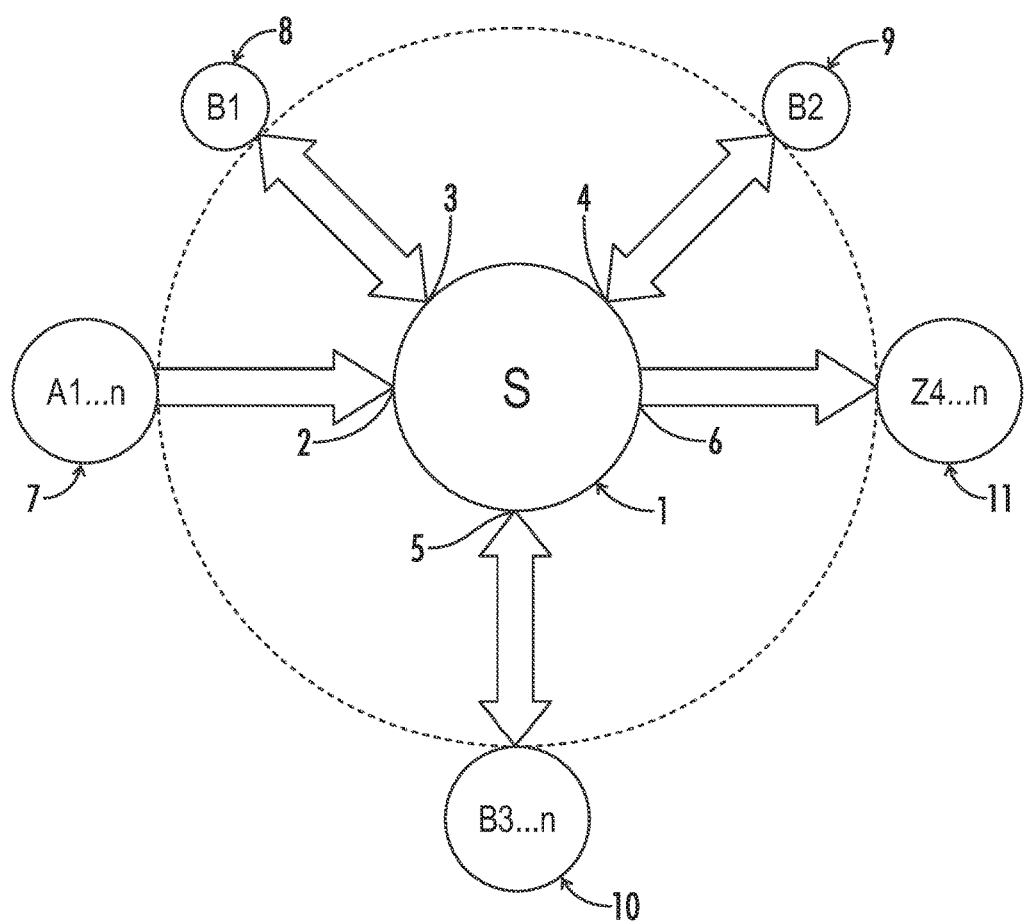
FIG. 1 is a schematic illustration of a system for processing printed products according to the present invention.

FIG. 1 illustrates the basic concept of a system for processing printed products and other articles according to the present invention. As shown in this FIG. 1 such a system comprises a transfer station 1 which is provided with an infeeding location 2, a number of connecting locations 3, 4, 5 and a removal location 6. A delivery station 7 is connected to the infeeding location 2 and delivers printed products to be fed to the transfer station 1. Processing stations 8, 9 and 10 are connected to an associated connecting location 3, 4, 5, respectively. These processing stations 8, 9, 10 receive printed products from the transfer station 1 and process these printed products. After the completion of the processing step in one of these processing stations 8, 9, 10, the processed printed products are transported back to the transfer station 1. An output station 11 is connected to the removal location 6 and receives the processed printed products from the transfer station 1.

The basic mode of operation of the system shown in FIG. 1 is an follows:

A printed product (or another article to be processed) is fed to the infeeding location 2 of the transfer device 1. The product is then moved within the transfer station 1 to a first connecting location, e.g. to connecting location 3. From this first connecting location 3 the printed product is transported to the processing station connected to the first connecting location, i.e. in our example to processing station 8. After the processing step in said processing station 8 is finished, the processed printed product is fed back to the transfer station 1. If no further processing is required, the finished printed product is moved within the transfer station 1 to the removal location 6 and from there to the output station 11. In case the printed product needs further processing, the product is moved within the transfer station to a second connecting location, e.g. to connecting location 5, then transported to the associated processing station, in our example to processing station 10, processed in this processing station and subsequently transported back to the transfer station 1. If a further processing of the printed product is required, the latter is moved to a third connecting location, in our example to connecting location 4, processed in the associated processing station (processing station 9) and then moved back to the transfer station 1. The finished processed product is then moved within the transfer station 1 to the removal location 6 and from there to the output station 11.

In an alternative embodiment the printed product fed to the infeeding location 2 is directly moved within the transfer station 1 to the removal location 6. In this embodiment no processing of the infed printed product takes place.

If required, the printed products can temporarily be buffered or stored within the transfer station 1 between the processing steps carried out at the various processing stations as well as after being infed to the transfer station 1 or prior to the removal from the transfer station 1.

Since all the processing stations 8, 9, 10 are connected to the transfer station 1 which serves as a kind of interchange for the processing stations 8, 9, 10 the products to be processed can be fed to the various processing stations in any possible sequence or order. In other words, the products can for example be processed first in the processing station 8, then in the processing station 9 and finally in the processing station 10.

Alternatively the printed product can first be processed in the processing station 10, then in the processing station 8 and finally in the processing station 9 without changing the physical layout of the system. It is also possible to route the product through only part of the processing stations.

Thus, in one embodiment, the system consists of a dynamic system allowing for the production of books with virtually no setup costs, totally automated production, high level of reliability as a system (without the single point of failure inherent to an inline system), high throughput, and the ability to easily add or modify processes.

The system starts with the software that accepts orders and sends the jobs to be produced to the print engines. The information on the job is contained in the software, as is various methods for tracking the product through the production process. Multiple print engines are used to gain high levels of throughput with high print quality (high quality is preferred in most cases, but not needed in some cases).

The print engines are connected by very fast robots (typically on a track, to allow for the highest speed and precision) allowing for any number of print engines to be connected to multiple finishing devices (although it could be multiple print engines to one finishing device, or one print engine to multiple finishing devices). When the book block is finished, the robot accepts the book from each print engine and brings it to the next step in the production process. The process of bringing it from one step to another can be repeated multiple times, until the final step of the robot bringing it to the completion area, which in most cases is a shipping station (it could be an inventory area, or many other locations).

FIGS. 2-5 show an embodiment of the system represented in FIG. 1 in greater detail. In FIGS. 2-5 the same reference numerals are used as in FIG. 1 for like structural elements.

Figure 2:
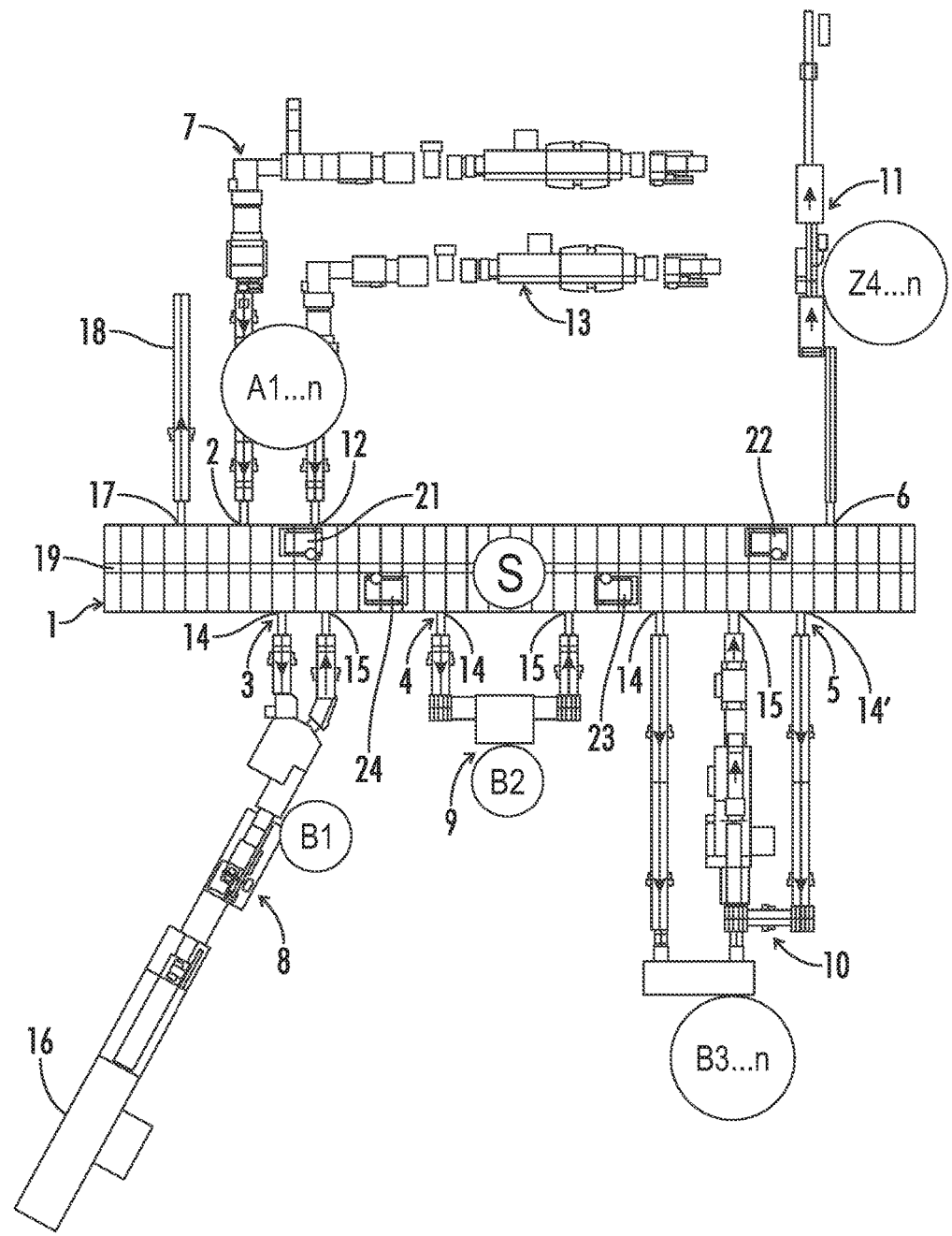
FIG. 2 is a top plan view of an embodiment of the present invention.
Figure 5:
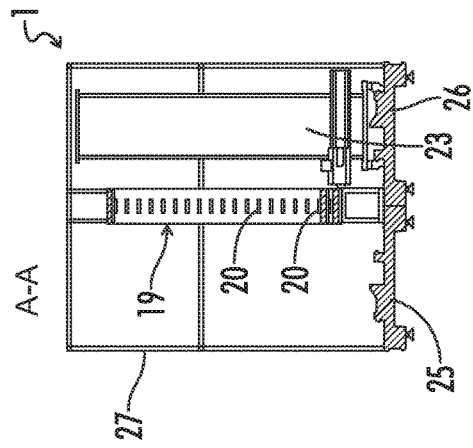
FIG. 5 is a cross-sectional view taken along line A-A of FIG. 3.
Figure 3:
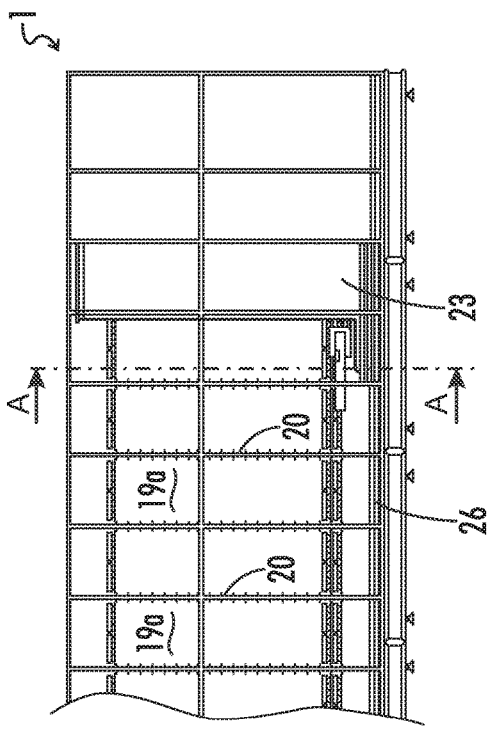
FIG. 3 is a side elevational view of one embodiment of the transfer station.
Figure 4:
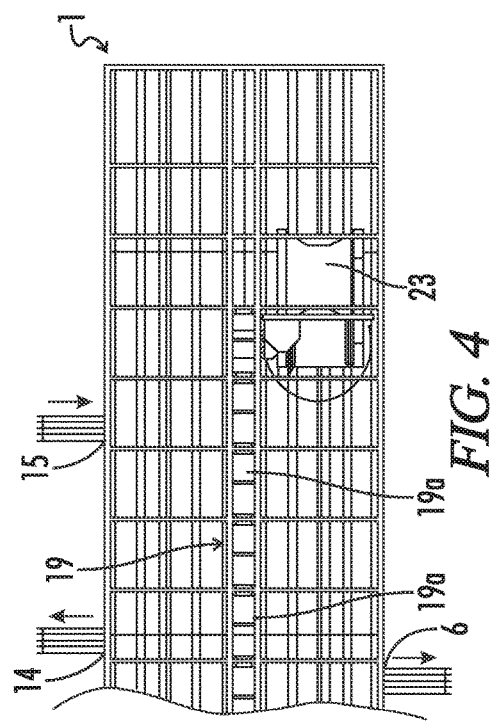
FIG. 4 is a top plan view of the transfer station shown in FIG. 3.

The system shown in FIG. 2 comprises also a transfer station 1, which is shown in greater detail in FIGS. 3-5. This transfer station 1 comprises a first infeeding location 2, first, second and third connecting locations 3, 4, 5 respectively and a first removal location 6—as the transfer station 1 of the system shown in FIG. 1. In addition thereto, the system of FIG. 2 is provided with a second infeeding location 12 and a second removal location 17. As in the system shown in FIG. 1 a first delivery station 7 is connected to the first infeeding location 2.

First, second and third processing stations 8, 9, 10 are connected to the connecting locations 3, 4, 5, respectively. An output station 11 is connected to the first removal location 6.

A second delivery station 13 is connected to the second infeeding location 12 of the transfer station 1. A conveyor device 18 is connected to the second removal location 17. This conveying device 18 serves to remove the printed products leaving the transfer station 1 at the second removal location 12.

As shown in FIG. 2 the first, second and third connecting locations 3, 4, 5, respectively, comprise an outfeeding location 14 and a receiving location 15. The third connecting location 5 has a second outfeeding location 14'. The printed products transported from the transfer station 11 to a processing station 8, 9, 10 are leaving the transfer station 1 at an outfeeding location 14, 14'. The printed products processed in a processing station 8, 9, 10 are fed back to the transfer station 1 at the associated receiving location 15.

Further shown in FIG. 2 is a supply station 16 connected to the first processing station 8.

As mentioned earlier the construction of the transfer station 1 is shown in greater detail in FIG. 3-5.

The elongated transfer station 1 has a central shelve 19 extending in the longitudinal direction of the transfer station 1. This shelve 19 is divided into a number of compartments 19a. Each compartment 19a is provided with a number of storage locations 20 arranged one upon another. The compartments 19a of the shelve 19 are accessible from both sides.

The transfer station 1 further comprises handling devices 21, 22, 23, 24 arranged on both sides of the shelve 19. The handling devices 21 and 22 are provided on one side of the shelve 19 and are travelling along a linear track 25 extending in the longitudinal direction of the shelve 19. The handling devices 23 and 24 are located on the other side of the shelve 19 and are also travelling along a linear track 26 extending in the longitudinal direction of the shelve 19. Each handling device 21, 22, 23, 24 is provided with a drive system (not shown) for moving the associated handling device 21, 22, 23, 24 along the track 25, 26, respectively.

It is evident that only one handling device or even more than two handling devices can be arranged on each side of the shelve 19.

The handling devices 21, 22, 23, 24 take over the printed products at an infeeding location 2, 12 or at a receiving location 15, move the products within the transfer station 1 and release the products at a removal location 6, 17 or at an outfeeding location 14. If a buffering or storing of a product is required, the handling devices 21, 22, 23, 24 place the product into a storage location 20 of the shelve 19 and remove the stored products from the shelve 19.

Each handling device 21, 22, 23, 24 is provided with at least one releasable gripper for seizing the printed products.

The shelve 19 and the handling devices 21, 22, 23, 24 are enclosed in a housing 27 (FIG. 5).

The mode of operation of the system shown in FIGS. 2-5 is the same as the mode of operation already explained in connection with FIG. 1. This means that the printed products fed to the transfer station at the infeeding locations 2, 12 are moved within the transfer station 1 to the outfeeding location 14 assigned to a first processing station 8, 9 or 10. After completion of the processing operation the printed product is moved back to the associated receiving location of the transfer station 1 and moved within the transfer station 1 to either a removal location 6, 17 or to a second outfeeding location 14 assigned to a second processing station 8, 9 or 10. From this second processing station the processed printed product is transported back to the related receiving location 15 and then either moved within the transfer station 1 to a removal location 6, 17 or—in the manner as explained earlier—to the third processing station 8, 9 or 10.

If required the products are temporarily stored or buffered in the shelve 19 between the various processing operations or after the infeeding or before the removal. The transport of the products within the transfer station 1 is taken over by the handling devices 21, 22, 23 and 24 as explained earlier.

In a preferred embodiment the system shown in FIGS. 2-5 is used for processing or producing books. In this embodiment the delivery stations 7 and 13 are printing stations and the output station 11 is a packaging station, whereas the first processing station 8 is a binding station, the second processing station 9 a trimming station and the third processing station 10 a shrink wrapping station. The supply station 16 delivers book covers to the binding station 8.

The printing units 7, 13 are used for printing book blocks which are transferred to the transfer station 1 and then transported to the binding station 8. In this binding station 8 the covers supplied by the supply station 16 and the book blocks are bound together. The bound components are then transferred back to the transfer station 1 and then transported to the trimming station 9, where excess margins are cut. The books processed in the trimming station 9 are transferred back to the transfer station 1 and then either transported to the removal location 6 in order to be packed in the packaging station 11 or fed to the shrink wrapping station 10 and from the latter back to the transfer station 1. The shrink wrapped books are then either transported to the first removal location 6 for packaging or to the second removal location 17 for being transported away by the conveying device 18.

The book blocks delivered to the transfer station 1 by the printing stations 7, 13 can be stored in the shelve 19 prior to being transported to the binding station 8. Equally the bound components transported back to the transfer station 1 can be temporarily stored in the shelve 19 prior to being delivered to the trimming station 9 and/or the shrink wrapping station 10. The finished books can also be temporarily stored in the shelve 19 prior to the removal at the removal locations 6 and 17.

It is understood that additional processing stations can be provided, e.g. a drilling station for drilling holes or an inserting station for inserting products, such as for example CDs, into the books.

The system shown in FIGS. 1-5 allows for a great flexibility in the order or sequence the various processing steps are carried out. Furthermore, any number of processing stations, infeeding locations and removal locations is possible.

Various modifications of the system shown and described above are conceivable, a few of which will now be referred to.

If required the products fed to the transfer station 1 can be moved directly to a removal location 6, 17 without undergoing a processing operation in one or more of the processing stations 8, 9, 10.

The product processed in a processing station can be transported away directly from this particular processing station without first being transported back to the transfer station 1.

The transfer station 1 itself can be of a construction different from the one shown in FIGS. 2-5.

The shelve 19 of the transfer station 1 can be designed to be open only at one side which results in a shelve 19 which is accessible from one side only.

Instead of the handling devices 21, 22, 23, 24 other suitable systems for transporting the products within the transfer station 1 are possible. For example a conveying system can be used which comprises one or more conveyors equipped with controllable grippers for seizing the printed products.

Although the system described above is preferably used for processing printed products, in particular books and components thereof, it is also conceivable to process other types of articles in the described manner.

Those skilled in the art will appreciate that various adaptations and modifications of the preferred embodiments described above can be configured without departing from the scope and spirit of the invention. Therefore, it is to be understood that, within the scope of the appended claims, the invention may be practised other than as specifically described herein.

The invention claimed is:

1. A method of producing printed products using a system comprising a transfer station and a plurality of processing stations located proximal to the transfer station, each processing station comprising at least one apparatus for producing a printed product using one or more work pieces, the method comprising:

determining a sequence of processing stations through which a work piece of the one or more work pieces passes to produce a printed product, at least one processing station in the sequence comprising a printer, at least a last processing station in the sequence being an output processing station, the sequence of processing stations including a first processing station and a second processing station;

selectively modifying the sequence of processing stations through which the work piece passes to produce a printed product, the last processing station in the sequence after modifying the sequence being an output processing station;

transferring a plurality of stacked sheets associated with the work piece between the first processing station and the second processing station of the processing stations and a fixed storage location in the transfer station using handling devices provided on both sides of a central shelve along a track extending in a direction of the central shelve, the fixed storage location selectively storing at least a portion of the plurality of stacked sheets via at least one storage location of the central shelve of the fixed storage location, the act of transferring comprising (i) transferring the plurality of stacked sheets from at least one storage location of the transfer station to the first processing station of the sequence, (ii) transferring the plurality of stacked sheets from the first processing station of the sequence to the at least one storage location of the transfer station, (iii) transferring the plurality of stacked sheets from the at least one storage location of the transfer station to the second processing station in the sequence, and (iv) transferring the plurality of stacked sheets from the second processing station in the sequence to the at least one storage location of the transfer station; and outputting the plurality of stacked sheets associated with the work piece by transferring the plurality of stacked sheets from the at least one storage location of the transfer station to the output processing station.

2. The method of claim 1, further comprising repeating the act of transferring, wherein the acts of transferring and repeating the act of transferring are entirely performed according to an unmodified sequence.

3. The method of claim 1 wherein the act of selectively modifying the sequence is performed:
after processing the work piece in first processing station identified in the sequence begins, and
before the work piece is transferred to the output processing station.

4. The method of claim 1 wherein transferring the work piece comprises:
performing an operation on the work piece in each of the processing stations in the sequence before the output processing station; and
transferring the work piece between the processing stations and the transfer station comprises transferring the work piece to only processing stations in the sequence and only to processing stations in an order identified in the sequence.

5. The method of claim 4 wherein further comprising:
performing an operation on the work piece in the output processing station.

6. The method of claim 1 wherein transferring the work piece from the transfer station to a next processing station in the sequence comprises moving the work piece past a work station past a processing station that is not the next processing station in the sequence.

7. The method of claim 1 wherein transferring the work piece comprises:
storing the work piece in the transfer station.

8. The method of claim 7 wherein the transfer station comprises a plurality of storage locations and the act of storing the work piece in the transfer station comprises placing the work piece in one of the storage locations.

9. The method of claim 7 wherein:
the act of transferring comprising transferring the work piece from a processing station identified in the sequence to the transfer station comprises transferring the work piece with a first transport mechanism; and
the act of transferring the work piece from the transfer station to a next processing station in the sequence comprises transferring the work piece with a second transport mechanism.

10. The method of claim 1 wherein the act of transferring the work piece between the processing stations and the transfer station comprises:
transferring the work piece between the processing stations and the transfer station with a non-conveyor mechanism.

11. The method of claim 10 wherein a robot comprises a gripper and the act of transferring the work piece between the processing stations and the transfer station comprises:
gripping the work piece with the gripper; and moving the work piece with a robot.

12. The method of claim 1 wherein one or more of the processing stations comprises an apparatus selected from the group consisting of a printer, a drilling apparatus, an insertion apparatus, a trimming apparatus, a shrink wrap apparatus, and a binding apparatus.

13. The method of claim 12 wherein at least one processing station comprises two or more apparatus selected form the group consisting of a printer, a drilling apparatus, an insertion apparatus, a trimming apparatus, a shrink wrap apparatus, and a binding apparatus.

14. The method of claim 1 wherein the act of transferring the work piece between at least one of the processing stations in the sequence and the transfer station comprises:
transferring the work piece from an outfeed location defined by the transfer station to the processing station; and
transferring the work piece from the processing station to an infeed location defined by the transfer station.

15. The method of claim 1 wherein at least one processing station in the sequence defines a path, wherein
the act of transferring the work piece from the transfer station to the processing station comprises placing the work piece on the path; and
the act of transferring the work piece from the processing station to the transfer station comprises removing the work piece from the path.

16. The method of claim 15 wherein at least one processing station in the sequence comprises a conveyor, wherein:
the act of transferring the work piece from the transfer station to the processing station comprises placing the work piece on the conveyor; and
the act of transferring the work piece from the processing station to the transfer station comprises removing the work piece from the conveyor.

17. The method of claim 1, further comprising:
after the step of transferring the plurality of stacked sheets associated with the work piece between the first processing station and the second processing station of the processing stations and the fixed storage location in the transfer station, further transferring (i) the plurality of stacked sheets associated with the work piece between the at least one storage location of the transfer station and a next of the sequence of processing stations, and (ii) the plurality of stacked sheets from the next of the sequence of processing stations to the at least one storage location of the transfer station; and repeating the act of further transferring until each of the plurality of stacked sheets associated with the work piece is transferred to the output processing station.

18. A method of producing printed products using a system comprising a transfer station and a plurality of processing stations located proximal to the transfer station, each processing station defining a path and comprising at least one apparatus for producing a printed product using one or more work pieces, the method comprising:

determining a sequence of processing stations through which a work piece of the one or more work pieces passes to produce a printed product, at least one processing station in the sequence comprising a printer, the last processing station in the sequence being an output processing station, the sequence of processing stations including a first processing station and a second processing station;

selectively modifying the sequence of processing stations through which the work piece passes to produce a printed product, the last processing station in the sequence after modifying the sequence being an output processing station, the selective modification being selectively performed after processing the work piece in the first processing station identified in the sequence begins and before the work piece is transferred to the output processing station;

transferring a plurality of stacked sheets associated with the work piece between the first processing station and the second processing station of the processing stations and a fixed storage location in the transfer station using handling devices provided on both sides of a central shelve along a track extending in a direction of the central shelve, the fixed storage location selectively storing at least a portion of the plurality of stacked sheets via at least one storage location of the central shelve of the fixed storage location, the act of transferring comprising (i) transferring the plurality of stacked sheets from the at least one storage location of the transfer station to the first processing station of the sequence, (ii) removing the plurality of stacked sheets from a path associated with the first processing station, (iii) transferring the plurality of stacked sheets removed from the path to the at least one storage location of the transfer station, (iv) storing the plurality of stacked sheets at a first location in the at least one storage location of the transfer station, (v) transferring the plurality of stacked sheets from the at least one storage location of the transfer station to the second processing station, (vi) placing the plurality of stacked sheets on a second path associated with the second processing station, and (vii) transferring the plurality of stacked sheets from the second processing station to the at least one storage location of the transfer station via the second path; and outputting the plurality of stacked sheets associated with the work piece by transferring the plurality of stacked sheets from the at least one storage location of the transfer station to the output processing station.

19. A system for producing printed products, the system comprising:

a transfer station, the transfer station having a fixed storage location, the fixed storage location including a central shelve having at least one storage location configured to store at least a portion of a plurality of stacked sheets associated with a work piece, the transfer station further including a plurality of handling devices provided on both sides of the central shelve along a track extending in a direction of the central shelve;

a plurality of processing stations located proximal to the transfer station, the plurality of processing stations including a first processing station and a second processing station, at least one processing station of the plurality of processing stations comprising a printer, each processing station being separate from the other processing stations, at least two processing stations in the plurality of processing station having a non-linear arrangement with respect to each other; and at least one work piece transfer mechanism positioned proximal to the transfer station and at least one of the processing stations, the work piece transfer mechanism configured to transfer at least one of the plurality of stacked sheets from the at least one storage location to the first processing station, to transfer the at least one of the plurality of stacked sheets from the first processing station to the at least one storage location, to transfer the at least one of the plurality of stacked sheets from the at least one storage location to the second processing station, and to transfer the at least one of the plurality of stacked sheets from the second processing station to the at least one storage location.

20. The system of claim 19 wherein the central shelve comprises a plurality of shelves.

21. The system of claim 20 wherein each of the shelves defines a plurality of storage locations.

22. The system of claim 19 wherein the transfer station defines at least one storage location.

23. The system of claim 22 wherein the transfer station defines a plurality of access locations, at least one access location positioned between each processing station and the transfer station.

24. The system of claim 23 wherein the plurality of access locations comprises at least one infeed location and at least one outfeed location.

25. The system of claim 23 wherein the access locations are positioned between at least one of the at least one work piece transport mechanism and the processing stations.

26. The system of claim 22 wherein the work piece transfer mechanism comprises at least one robot.

27. The system of claim 26 wherein the robot comprises a gripper.

28. The system of claim 26 wherein: the transfer station defines a path;

the path is positioned between the at least one storage location and at least two or more of the plurality of processing stations; and the robot is positioned on the path.

29. The system of claim 26 wherein the at least one work piece transport mechanism comprises two or more robots.

30. The system of claim 19 wherein one or more of the processing stations comprises an apparatus selected from the group consisting of a printer, a drilling apparatus, an insertion apparatus, a trimming apparatus, a shrink wrap apparatus, and a binding apparatus.

31. The system of claim 19 with in at least one processing station comprises two or more apparatus selected form the group consisting of a printer, a drilling apparatus, an insertion apparatus, a trimming apparatus, a shrink wrap apparatus, and a binding apparatus.

32. The system of claim 19 wherein each processing station defines a path for the work piece, a path of each processing station being separate from a path for each of the other processing stations.

33. The system of claim 32 wherein the path defined in at least one of the processing stations is at least partially defined by a conveyor.

34. A system for producing printed products from one or more work pieces, the system comprising:
- a transfer station, the transfer station defining at least one storage location and a plurality of infeed locations and outfeed locations, at least a plurality of the storage locations configured to hold a plurality of stacked sheets associated with at least one of the one or more work pieces, the transfer station further including a plurality of handling devices provided on both sides of a central shelve along a track extending in a direction of the central shelve;
- a plurality of processing stations located proximal to the transfer station, at least one processing station comprising a printer, each processing station being separate from other processing stations in the plurality of processing stations, at least two processing stations in the plurality of processing station having a non-linear arrangement with respect to each other, and each processing station defining a path for at least one of the plurality of stacked sheets associated with the at least one work piece, the path of each processing station being separate from the path for each of the other processing stations; and
- at least one work piece transfer mechanism configured to transfer the at least one of the plurality of stacked sheets of the at least one work piece, the work piece transfer mechanism comprising at least one robot, the work piece transport mechanism being positioned at least partially between the plurality of processing stations and the at least one storage location, the work piece transfer mechanism being configured to transfer the at least one of the plurality of stacked sheets from a first processing station of the plurality of processing stations to the transfer station, configured to transfer the at least one of the plurality of stacked sheets from the transfer station to a second processing station of the plurality of processing stations, and configured to transfer the at least one of the plurality of stacked sheets from the second processing station to the transfer station.

\* \* \* \* \*